G. RICHARDSON.

Spindle-Bolster for Spinning-Machine

No. 6,415. Reissued May 4, 1875.

Witnesses.
S. N. Piper
L. N. Miller

George Richardson.
by his attorney
R. H. Eddy

THE GRAPHIC CO. PHOTO-LITH. 39 & 41 PARK PLACE, N.Y.

UNITED STATES PATENT OFFICE.

GEORGE RICHARDSON, OF LOWELL, MASSACHUSETTS, ASSIGNOR OF ONE-HALF INTEREST TO THE LOWELL MACHINE-SHOP.

IMPROVEMENT IN SPINDLE-BOLSTERS FOR SPINNING-MACHINES.

Specification forming part of Letters Patent No. 148,625, dated March 17, 1874; reissue No. 6,415, dated May 4, 1875; application filed October 28, 1874.

DIVISION A.

*To all whom it may concern:*

Be it known that I, GEORGE RICHARDSON, of Lowell, of the county of Middlesex and State of Massachusetts, have invented a new and useful Improvement in Mechanism for Spinning; and do hereby declare the same to be fully described in the following specification and represented in the accompanying drawings, in which—

Figure 1:
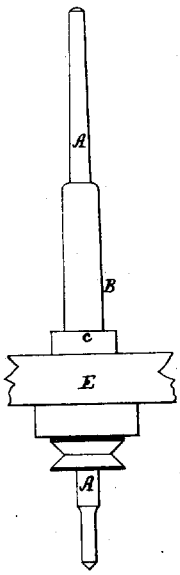
Figure 3:
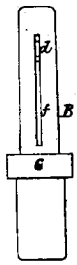
Figure 4:
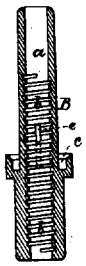
Figure 2:
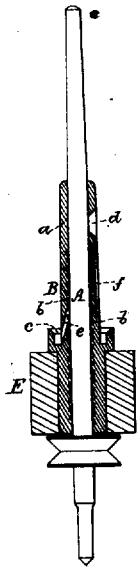

Figure 1 denotes a front elevation, and Fig. 2 a vertical section, of a spinning-frame spindle and its bolster, provided with my invention. Fig. 3 is a front elevation, and Fig. 4 a vertical section, of the bolster.

One object of my invention is the adaptation of the subject of the United States Patent No. 143,785, granted to me on October 21, 1873, to long bolsters, which are or are to be encompassed by the bobbin while being supported or sustained and revolved by the spindle.

In order to so insulate from the bobbin the descending current of oil that such oil may not gather upon the bore of the bobbins and descend therein, and be thrown off at and tangentially from its bottom, I construct the long bolster with a groove or channel arranged within its outer surface, and to descend from the educt leading out of the bolster near its upper end, such channel being of such a depth as to convey the oil down from the educt to the reservoir or trough without contact with the bobbin, which usually nearly touches the outer surface of the bolster.

In the drawings, A denotes the spindle, and B the bolster, the bobbin being supported by the spindle, which, in this case, is what is termed a "stump-spindle," or one whose top is considerably below the top of the bobbin. The bore *a* of the bolster is provided with one or more helical grooves, *b*, to go around within it. Each groove I usually close at its ends, and it is to extend from near the bottom to near the top of the bore of the bolster. The bolster I form or construct with a surrounding channel or trough, *c*, for the reception of oil, such trough being heated below the bobbin, and at the top of the bolster-rail E. Through the upper part of the bolster I form an educt, *d*, to extend laterally out of the bore and into a groove or channel, *f*, made down in the outside of the bolster, and extended to or nearly to the trough, and below the bobbin when in place about the bolster and on the spindle. I also form in that part of the bolster which is above and next the trough, one or more capillary holes, passages, or inducts, *e*, inclined and opening into the bore from the trough, in manner as shown.

I herein make no claim to the bolster constructed as represented and claimed in my said Patent No. 143,785; but

I claim—

The bolster, constructed so as when in use to extend into the bobbin and above its base or lower end, and provided with the reservoir or trough *c*, one or more capillary inducts, *e*, one or more helical grooves *b*, and educt, *d*, and the descending channel or groove *f*, all arranged substantially as specified.

GEO. RICHARDSON.

Witnesses:

R. H. EDDY,

J. R. SNOW.